Sept. 5, 1950          T. J. DOYLE          2,521,505
APPARATUS FOR ASSEMBLING RIVET SETTING ANVILS
Filed Sept. 4, 1946                            2 Sheets-Sheet 1
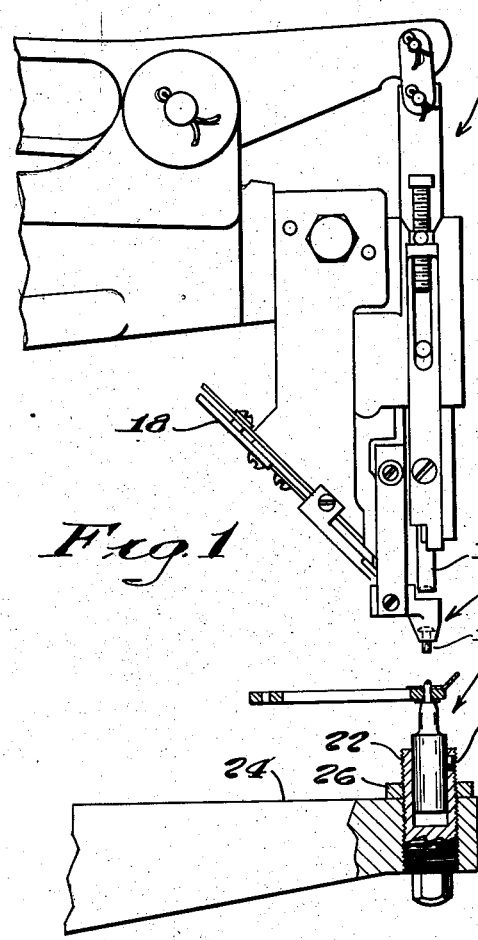
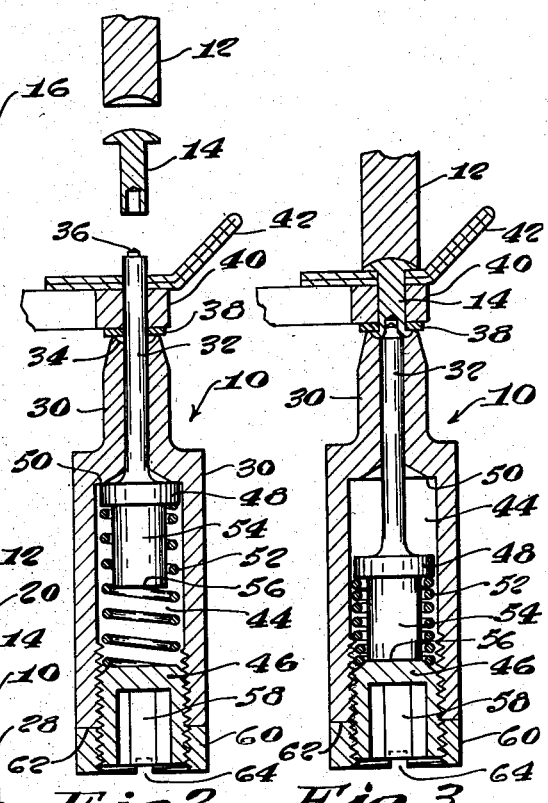
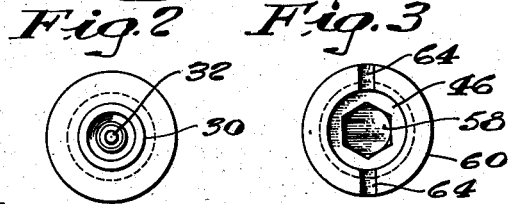
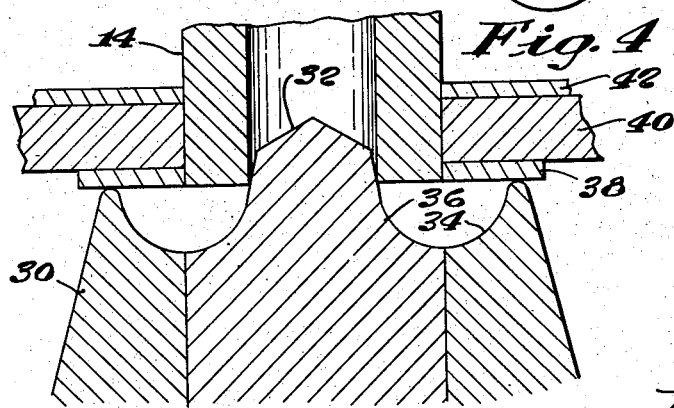
INVENTOR.
Thomas J. Doyle
BY J. Stanley Churchill
ATTORNEY

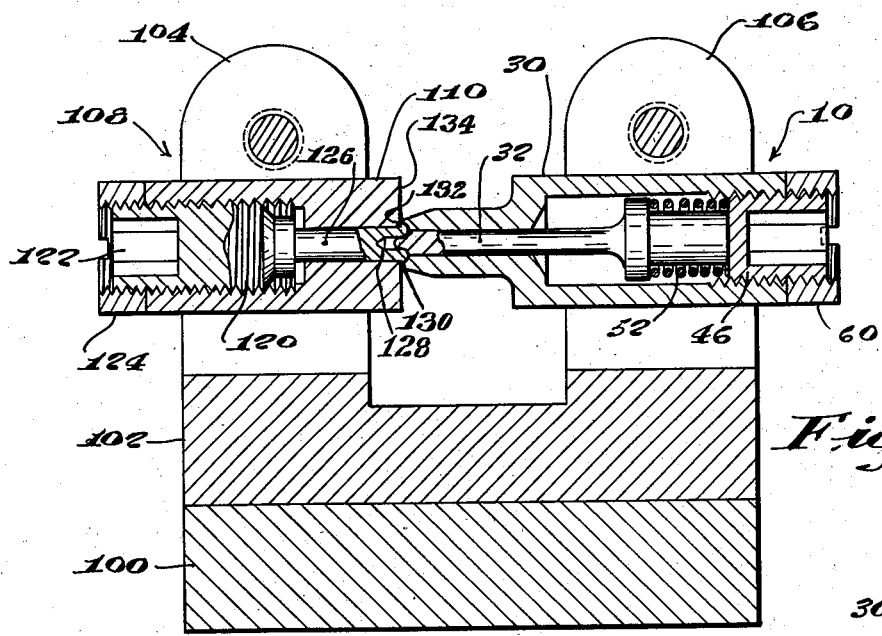
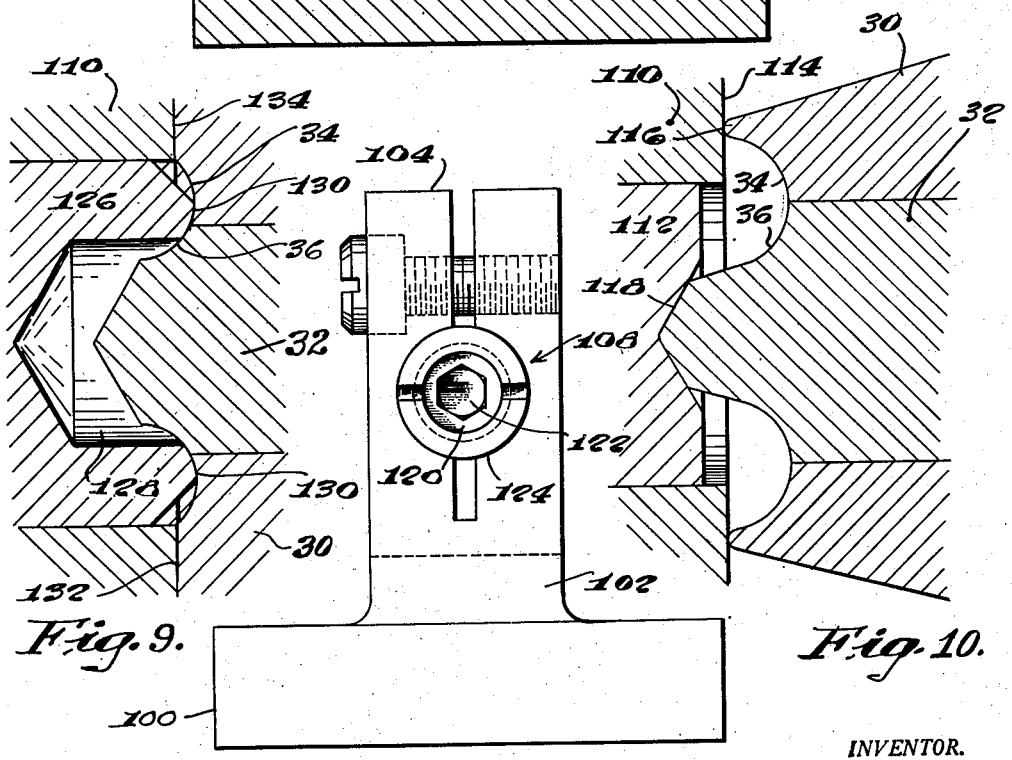

Patented Sept. 5, 1950

2,521,505

UNITED STATES PATENT OFFICE 2,521,505

APPARATUS FOR ASSEMBLING RIVET SETTING ANVILS

Thomas J. Doyle, Milton, Mass., assignor to Tubular Rivet and Stud Company, Quincy, Mass., a corporation of Massachusetts Application September 4, 1946, Serial No. 694,740

1 Claim. (Cl. 33—181)

This invention relates to an apparatus for assembling a rivet setting anvil.

The invention has for an object to provide a novel and improved apparatus for assembling a rivet setting anvil of the spring pin type in which provision is made for accurately aligning the separable portions thereof in assembled relation in a rapid, economical and efficient manner.

With this general object in view and such others as may hereinafter appear, the invention consists in an apparatus for assembling a rivet setting anvil hereinafter described and particularly defined in the claim at the end of this specification.

In the drawings illustrating the preferred embodiment of the invention, Fig. 1 is a side elevation of a rivet setting machine embodying an anvil of the spring pin type; Figs. 2 and 3 are cross sectional views of the spring pin anvil shown in a position preparatory to setting a rivet and in rivet setting position respectively; Figs. 4 and 5 are top and bottom end views respectively of the anvil; Fig. 6 is a greatly enlarged view of the separable portions of the anvil in their aligned and rivet setting position of operation; Fig. 7 is a cross sectional view of an assembly fixture embodying the present invention; Fig. 8 is an end view of the same; Fig. 9 is a greatly enlarged view of the separable portions of the anvil in engagement with the aligning portions of the assembly fixture to be hereinafter more fully described; and Fig. 10 is a view similar to Fig. 9 illustrating a modified form of the aligning portions of the assembly fixture.

In general the present invention contemplates a novel apparatus for assembling a spring pin type of rivet setting anvil whereby the separable portions thereof may be aligned in accurate registration for the rivet setting operation, and, the invention further contemplates the provision of a novel and improved fixture including an adjustable gauge arranged to permit the separable portions of the rivet setting anvil to be quickly and easily aligned in accurately assembled relation.

The spring pin type of anvil herein illustrated is particularly designed for use with a machine for setting hollow rivets and comprises separable portions including a body portion and a spring pressed pin portion slidably mounted in an axial bore in the body portion, the upper end of the pin being normally extended beyond the upper end of the body portion. Each separable portion has formed at its upper end one component of the anvil or die surface, and in operation, the parts to be secured in assembled relation are placed over the extended pin and upon engagement of the hollow rivet with the pin, the latter is depressed into a position to cooperate with the body portion thus bringing the component surfaces of the die into alignment to perform the rivet setting operation.

In practice it is required that the component parts of the separable rivet setting members of the anvil be in absolute alignment to form a continuous curved surface in order to obtain an efficient rivet setting operation without the development of obstructions to the flow of metal of the tubular end of the rivet as it is being set up. For example, in the event that the curved surface of the pin member is slightly higher than the curved surface of the body portion the metal will flow outwardly to an extent such as to split the metal and form cracks in the edges of the spread out metal. On the other hand, in the event that the curved surface of the body portion of the anvil is slightly higher than the curved surface of the end of the pin, a jam will occur and effect outward buckling of the hollow end of the rivet which, in some instances, may effect breakage of the parts being assembled.

The usual practice heretofore followed in order to accurately align the component surfaces in their correct rivet setting position of operation is to assemble the component parts and then depress the pin until it comes into engagement with a stop which may then be adjusted gradually until the component surfaces are brought into alignment. It will be understood that although the anvil unit herein shown has been purposely illustrated at an enlarged scale for sake of clearness, in actual practice, the component surfaces to be aligned are exceedingly small in some instances and in order to effect such accurate alignment it was necessary to employ a skilled mechanic who with the aid of a jeweller's magnifying glass required a considerable amount of time to make the adjustment thus greatly increasing the cost and manufacturing expense in producing the rivet setting anvil unit. This manner of assembly and adjustment is of particular disadvantage when a worn or broken pin is to be replaced on a particular installation since the entire anvil unit must be sent back to the manufacturer to be provided with an accurately adjusted pin thus causing a loss in productive time of the machine.

In accordance with the present invention, an assembly fixture having an adjustable and preset gauge is provided by which the separable parts may be quickly and easily assembled in accurately aligned adjustment by a relatively unskilled person thus effecting a substantial economy in time and labor in producing the anvil unit. Also, in practice, the customer may be provided with one or more assembly fixtures which have been pre-set at the factory to fit the requirements of the particular size or sizes of rivets used with a particular rivet setting machine. Thus, in making replacements, the customer may make use of the assembly fixture to assure accurate adjustment of the anvil unit in a minimum of time, thus eliminating the necessity for sending the unit back to the manufacturer and increasing the productive time of the machine.

Referring now to the drawings, see Fig. 1, a typical rivet setting machine in which a spring pin type of anvil may be employed comprises in general an anvil unit 10 and a vertically reciprocal driver 12 arranged to cooperate with the anvil to effect setting of the hollow rivet 14 to secure together the parts to be assembled. The driver 12 may be actuated through any usual or preferred driving mechanism such as a one revolution clutch, not shown, and through linkage indicated generally at 16 to effect vertical recriprocation of the driver. A supply of rivets is maintained in a feed chute 18 which is arranged to release a rivet each cycle of operation into a position between a pair of yieldably mounted jaws 20 arranged to hold the rivet in alignment with the driver and the anvil. In operation, the holding jaws 20 are arranged to move with the driver for a part of the downward stroke until the hollow end of the rivet engages the anvil whereupon the jaws come to rest. Continued movement of the driver in engagement with the head of the rivet causes the yieldably mounted jaws to spread apart to release the rivet and permit the driver in cooperation with the anvil to effect setting of the rivet. As shown in Fig. 1 the anvil unit may be stationarily supported in a threaded holding member 22 adjustably carried in a bracket 24 forming a part of the machine frame. A lock nut 26 may be provided for locking the unit in its adjusted position in accordance with the stroke of the driver and length of the rivet being set. A set screw 28 may also be provided to hold the anvil in the member 22.

Referring now to Figs. 2 and 3, the separable rivet setting anvil 10 comprises generally a cylindrical body portion 30 and a spring pressed pin 32 slidingly mounted in an axial bore in the body portion 30, and, the upper end of each member 30, 32 is provided with component die surfaces 34, 36 of the annular concave rivet setting die surface of the anvil. The pin 32 is normally extended beyond the upper end of the body portion, as shown in Fig. 2, to receive thereon the parts to be secured together in assembled relation, a typical assembly being herein shown as comprising a radio part which includes a metal washer 38, ceramic insulating ring 40, and a metallic connecting element 42. In operation, the spring pressed pin is arranged to be depressed to align the upper end thereof with the upper end of the body portion so that the component surfaces 34, 36 form a continuous rivet engaging surface during the setting operation.

The spring pressed pin 32 is limited in its upward extension by the engagement of a collared portion 48 with the end surface or shoulder 50 formed by an enlarged bore 44, and, is adjustably limited in its downwardly depressed position by the engagement of the lower end 56 of a depending portion 54 with a threaded stop screw 46 provided in the lower end of the body 30. A coil spring 52 interposed between the underside of the collared portion 48 and the top of the stop screw 46 retains the pin in its extended position until engaged by a rivet 14 being driven by the driver 12 into setting position, as shown in Fig. 3. A lock nut 60 cooperates with the lower end of the screw 46, and, when tightened into locking position, engages the end surface 62 of the body 30, as illustrated. With this construction, it will be seen that correct alignment of the component surfaces 34, 36 may be effected by adjustment of the stop screw 46, a hexagonal opening being provided in the end thereof arranged to receive a hexagonal wrench to facilitate adjustment, and thereafter rotating the lock nut 60 to lock the unit in its adjusted position. Slots 64 may be provided in the lock nut to facilitate rotation thereof, the nut preferably being cylindrical and of the same diameter as the body to form an extension thereof, as shown.

As above stated, the conventional method of aligning the component surfaces 34, 36 of the die required the services of a skilled mechanic and a considerable amount of time to effect the accurate adjustment required. Referring now to Figs. 7, 8 and 9, in accordance with the present invention, provision is made for facilitating assembly of the anvil unit in accurately adjusted position whereby a relatively unskilled person may quickly and easily effect the adjustment. For this purpose, as shown in Fig. 7, an assembly fixture is provided which comprises a base member 100 having a standard 102 mounted thereon which is provided with two spaced and axially aligned clamp members 104, 106, one clamp member 104 being arranged to support a gauge unit 108, and, the other clamp member 106 being arranged to support an anvil unit 10 in axial alignment with the gauge unit 108.

The gauge unit 108 is provided with surfaces adjustable with relation to each other and which may be pre-set in the correct relative position for engagement with the end surfaces of the separable portions of the anvil to align the latter in operative position during the assembly operation, and, as herein shown, see Figs. 7 and 9, one form of the gauge unit 108 comprises a cylindrical body portion 110 having an axial bore in which a pin 126 is adjustably mounted. The end surface 134 of the body portion 110 comprises a fixed surface against which the non-movable end 132 of the anvil body 30 may engage, and, the adjustable or independently movable pin member or gauge element 126 may be provided with a small central bore in its anvil engaging end defining with the outside diameter of the gauge element 126 an annular rim 130 curved and shaped at its outer end to fit into the annular recess of the anvil formed by the component surfaces 34, 36. The pin 126 may and preferably will be formed integrally with an adjusting screw 120 which is received in the end of the body portion and which may be adjusted by a hexagonal wrench inserted in an opening 122 provided therefor. The screw 120 preferably extends beyond the end of the body portion 110 and is provided with a lock nut 124 arranged to be tightened up against the end surface of the body when in locked position.

With this construction it will be seen that the pin or gauge element 126 may be adjusted in a position so that the curved end of the annular rim portion 130 will bear against and fit into the complementary shaped portion 34 of the annular recess formed in the body portion 30 of the anvil, and, in practice, the gauge unit 108 is locked in such position and secured in the clamp member 104, as illustrated in Fig. 7. With the pre-set gauge thus secured, the first step in assembling the anvil is to insert the anvil body 30 in the clamp 106 with the end surface 132 of the anvil body up against the end surface 134 of the gauge body 110 and while thus held the anvil body is clamped in position. Thereafter the anvil pin 32, spring 52 and adjusting screw 46 respectively are assembled in the anvil body with the curved end surface 36 of the pin 32 engaging the curved end surface 130 of the gauge pin 126 to align the component surfaces 34, 36. Thus in operation, the continuous annular and complementary shaped rim surface 130 of the gauge element 126 is arranged to simultaneously engage the coextensive surfaces 34, 36 of the non-movable and movable components 30, 32 respectively of the anvil 10 to properly align such surfaces. The non-movable end portion 132 of the anvil body 30 may also bear against the fixed surface 134 of the gauge body 110 at this time, as illustrated, since in practice an accurate uniform distance between the surface 132 and the bottom of the annular recess of the die is maintained. The screw 46 is now tightened in the body 30 against the spring 52, until the end of the screw engages the end surface 56 of the pin to thus hold the pin firmly between the gauge pin 126 and the screw 46 and with the surfaces 34, 36 in correct alignment. The check nut 60 is then tightened to lock the stop screw in its adjusted position and the completely assembled anvil unit 10 is removed from the assembly fixture. Upon removal of the unit 10 the pin 32 is caused to be projected by the spring 52 to its normally extended position so that when the pin 32 is depressed during the rivet setting operation the stop screw 46 is in the proper position of adjustment to effect exact alignment of the die surfaces of the separable members of the anvil.

It will be understood that, in practice, the adjustable gauge member 108 may and preferably will be pre-set at the factory for a particular size of anvil unit, and that a different gauge unit may be provided for each different size of anvil. Thus, when a particular gauge unit is adjusted for a specific size of anvil unit, any number of anvil units of this size may be quickly and accurately assembled in the manner above described thus effecting a substantial economy in time and labor and assuring accurate adjustment whereby spoilage of the parts being riveted is reduced to a minimum.

Another form of the aligning portions of the gauge 108, as illustrated in Fig. 10, may include an adjustable pin member 112 having a conically shaped central opening 118. The end surface 114 of the body portion 110 is arranged to bear against the end surface 116 of the anvil body 30, and the end surface 118 of the adjustable pin 112 is arranged to receive the conically shaped end of the spring pressed pin 32. Thus, in operation, the end surface 118 of the gauge element 112 may be adjusted with relation to the end surface 114 of the body 110 to provide the proper spacing to align the separable die surfaces 34, 36 when the parts are assembled and adjusted as above described.

While the preferred embodiment of the invention has been herein illustrated and described, it will be understood that the invention may be embodied in other forms within the scope of the following claim.

Having thus described the invention, what is claimed is:

A gauge for setting a movable component of a workpiece relative to a non-movable component thereof, comprising, a gauge body, a first gauge element held in fixed position thereon, means for fixedly holding and rigidly clamping a workpiece on said gauge body with a portion of the non-movable component in abutting relation to said first gauge element, a second gauge element mounted for independent movement relative to and through the work contacting portion of said first gauge element toward and from a workpiece in said holding means, means for locking said second gauge element in fixed relation to said first element, the said movement of said second element being in a direction substantially parallel to the direction of movement of said movable workpiece component when in said holding means, said second gauge element having a continuous surface in position to simultaneously engage adjacent coextensive surfaces of said movable and non-movable components, the said continuous surface being complementary in shape to said coextensive surfaces.

THOMAS J. DOYLE.

REFERENCES CITED

The following references are of record in the file of this patent:

UNITED STATES PATENTS

| Number | Name | Date |
| --- | --- | --- |
| 85,372 | Elliott | Dec. 29, 1868 |
| 313,552 | Sweet | Mar. 10, 1885 |
| 438,851 | Malmquist | Oct. 21, 1890 |
| 793,620 | Bailey | June 27, 1905 |
| 1,317,746 | Whatley | Oct. 7, 1919 |
| 1,435,428 | Stromgren | Nov. 14, 1922 |
| 1,679,189 | Wadell | July 31, 1928 |
| 2,018,777 | Edwards | Oct. 29, 1935 |
| 2,108,077 | Robinson | Feb. 15, 1938 |
| 2,135,296 | Towne | Nov. 1, 1938 |
| 2,425,113 | Miller | Aug. 5, 1947 |